(12) United States Patent
Tsutsui

(10) Patent No.: US 12,537,257 B2
(45) Date of Patent: Jan. 27, 2026

(54) BATTERY MODULE, VEHICLE, AND METHOD OF MANUFACTURING BATTERY MODULE

(71) Applicant: Panasonic Intellectual Property Management Co., Ltd., Osaka (JP)

(72) Inventor: Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 631 days.

(21) Appl. No.: 17/974,171

(22) Filed: Oct. 26, 2022

(65) Prior Publication Data
US 2023/0041711 A1 Feb. 9, 2023

Related U.S. Application Data

(63) Continuation of application No. PCT/JP2021/016672, filed on Apr. 26, 2021.

(30) Foreign Application Priority Data

May 12, 2020 (JP) .................................. 2020-083594

(51) Int. Cl.
*H01M 50/267* (2021.01)
*B60L 50/64* (2019.01)
(Continued)

(52) U.S. Cl.
CPC ........... *H01M 50/253* (2021.01); *B60L 50/64* (2019.02); *H01M 10/0562* (2013.01);
(Continued)

(58) Field of Classification Search
CPC ............. H01M 50/204; H01M 50/209; H01M 50/267; H01M 2300/0065;
(Continued)

(56) References Cited

U.S. PATENT DOCUMENTS

2003/0186116 A1  10/2003 Tanjou
2018/0366700 A1* 12/2018 Tsutsui ................ H01M 50/204
(Continued)

FOREIGN PATENT DOCUMENTS

JP  2003-282154 A  10/2003
JP  2013-041749 A   2/2013
(Continued)

OTHER PUBLICATIONS

International Search Report issued on Jul. 20, 2021 in International Patent Application No. PCT/JP2021/016672, with English translation.

*Primary Examiner* — Christopher P Domone
(74) *Attorney, Agent, or Firm* — Rimon P.C.

(57) ABSTRACT

A battery module of the present disclosure includes a battery case, at least one sulfide-based battery disposed inside the battery case, and at least one halogen-based battery disposed inside the battery case. A vehicle of the present disclosure includes the battery module and an electric motor configured to be driven by electric power supplied from the battery module. A method of manufacturing a battery module of the present disclosure includes disposing at least one sulfide-based battery inside the battery case and disposing at least one halogen-based battery inside the battery case.

18 Claims, 13 Drawing Sheets

(51) Int. Cl.
*H01M 10/0562* (2010.01)
*H01M 10/0566* (2010.01)
*H01M 50/209* (2021.01)
*H01M 50/238* (2021.01)
*H01M 50/249* (2021.01)
*H01M 50/253* (2021.01)

(52) U.S. Cl.
CPC ..... *H01M 10/0566* (2013.01); *H01M 50/209* (2021.01); *H01M 50/238* (2021.01); *H01M 50/249* (2021.01); *H01M 50/267* (2021.01); *H01M 2220/20* (2013.01); *H01M 2300/0025* (2013.01); *H01M 2300/008* (2013.01)

(58) Field of Classification Search
CPC . H01M 2300/0068; H01M 2300/0071; H01M 2300/0074; H01M 2300/008; H01M 10/0562
See application file for complete search history.

(56) References Cited

U.S. PATENT DOCUMENTS

| | | | | |
|---|---|---|---|---|
| 2019/0081352 | A1* | 3/2019 | Sasaki | H01B 1/122 |
| 2020/0014009 | A1 | 1/2020 | Tsutsui | |
| 2020/0091499 | A1* | 3/2020 | Yoshima | H01M 4/131 |
| 2022/0416296 | A1* | 12/2022 | Nakama | H01B 1/06 |

FOREIGN PATENT DOCUMENTS

| | | |
|---|---|---|
| JP | 2013-044701 A | 3/2013 |
| JP | 2015-069848 A | 4/2015 |
| JP | 2019-003930 A | 1/2019 |
| JP | 2020-013775 A | 1/2020 |
| JP | 2021-099949 A | 7/2021 |

\* cited by examiner

BATTERY MODULE, VEHICLE, AND METHOD OF MANUFACTURING BATTERY MODULE

This application is a continuation of PCT/JP2021/016672 filed on Apr. 26, 2021, which claims foreign priority of Japanese Patent Applications No. 2020-083594 filed on May 12, 2020, the entire contents of both of which are incorporated herein by reference.

BACKGROUND OF THE INVENTION

1. Field of the Invention

The present disclosure relates to a battery module, a vehicle, and a method of manufacturing a battery module.

2. Description of Related Art

In recent years, research and development have been actively performed on batteries using a solid electrolyte. JP 2015-069848 A discloses an all-solid-state battery including a positive electrode, a sulfide solid electrolyte layer, and a negative electrode in this order.

SUMMARY OF THE INVENTION

Batteries vary in characteristics depending on the solid electrolyte to be used. The present disclosure provides a battery module having an excellent balance between output characteristics and safety.

A battery module of the present disclosure includes:
a first battery case;
at least one sulfide-based battery disposed inside the first battery case; and
at least one halogen-based battery disposed inside the first battery case.

The present disclosure can provide a battery module having an excellent balance between output characteristics and safety.

DETAILED DESCRIPTION

Figure 1A:
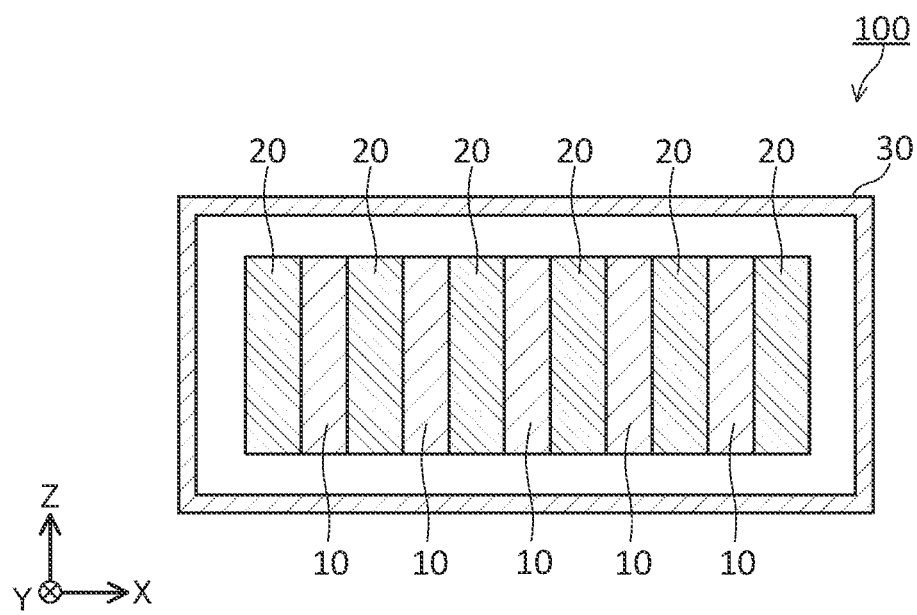
FIG. 1A is a schematic cross-sectional view of a battery module of Embodiment 1, taken along a plane parallel to the Z-X plane.

Findings on which the Present Disclosure is Based

A battery using a sulfide-based solid electrolyte as a solid electrolyte is excellent in output characteristics. On the other hand, a battery using a halogen-based solid electrolyte as a solid electrolyte is more excellent in safety than a battery using a sulfide-based solid electrolyte as a solid electrolyte.

In the present disclosure, the term "output characteristics" of a battery means the capacity per unit volume or unit weight of the battery. The term "safety" of a battery means the resistance to burning of the battery, and can be evaluated based on, for example, a burning test of a solid electrolyte, which is a battery material. The burning test is performed in accordance with "Determination of burning behaviour by oxygen index" specified in JIS K7201.

Overview of One Aspect According to the Present Disclosure

A battery module according to a first aspect of the present disclosure includes:
a first battery case;
at least one sulfide-based battery disposed inside the first battery case; and
at least one halogen-based battery disposed inside the first battery case.

According to the first aspect, it is possible to provide a battery module having an excellent balance between the output characteristics of a sulfide-based battery and the safety of a halogen-based battery.

In a second aspect of the present disclosure, for example, in the battery module according to the first aspect, the sulfide-based battery and the halogen-based battery may be plate-like, and an area of a principal surface of the halogen-based battery may be larger than an area of a principal surface of the sulfide-based battery. With such a configuration, it is possible to provide a battery module in which the output characteristics of a sulfide-based battery are maintained and the safety of a halogen-based battery is improved.

In a third aspect of the present disclosure, for example, in the battery module according to the first or second aspect, the sulfide-based battery and the halogen-based battery may be plate-like, and when the halogen-based battery and the sulfide-based battery are viewed in plan from a thickness direction of the halogen-based battery, an entire outline of the sulfide-based battery may be inside an outline of the halogen-based battery. With such a configuration, it is possible to provide a battery module in which the output characteristics of a sulfide-based battery are maintained and the safety of a halogen-based battery is further improved.

In a fourth aspect of the present disclosure, for example, in the battery module according to any one of the first to third aspects, the halogen-based battery may be in contact with the sulfide-based battery. With such a configuration, it is possible to provide a battery module in which the output characteristics of a sulfide-based battery are maintained and the safety of a halogen-based battery is improved. Furthermore, it is possible to reduce the volume occupied by the sulfide-based battery and the halogen-based battery, thereby achieving an increased capacity of the battery.

In a fifth aspect of the present disclosure, for example, in the battery module according to any one of the first to fourth aspects, the at least one halogen-based battery may include a plurality of halogen-based batteries, the sulfide-based battery and the halogen-based battery may be arranged in a predetermined direction inside the first battery case, and the halogen-based battery may be positioned at each of one end and the other end in the predetermined direction. With such a configuration, the halogen-based battery with high safety is positioned at each of one end and the other end inside the first battery case, and accordingly it is possible to provide a battery module with further improved safety.

In a sixth aspect of the present disclosure, for example, in the battery module according to the fifth aspect, the at least one sulfide-based battery may include a plurality of sulfide-based batteries. With such a configuration, the plurality of sulfide-based batteries with high output characteristics are included, and accordingly it is possible to provide a battery module with further improved output characteristics.

In a seventh aspect of the present disclosure, for example, in the battery module according to the sixth aspect, the sulfide-based battery and the halogen-based battery may be arranged alternately in the predetermined direction inside the first battery case. With such a configuration, it is possible to provide a battery module having a more excellent balance between the output characteristics of a sulfide-based battery and the safety of a halogen-based battery.

In an eighth aspect of the present disclosure, for example, in the battery module according to any one of the fifth to seventh aspects, the sulfide-based battery may be disposed in a space enclosed by a principal surface of the halogen-based battery and an inner wall of the first battery case. With such a configuration, it is possible to ensure the safety of the sulfide-based battery by the halogen-based battery and the inner wall of the first battery case, thereby providing a battery module with more excellent safety.

In a ninth aspect of the present disclosure, for example, in the battery module according to any one of the first to eighth aspects, the sulfide-based battery and the halogen-based battery each may have a principal surface and a side surface, the at least one halogen-based battery may include a first halogen-based battery and a second halogen-based battery, and the first halogen-based battery may cover the principal surface of the sulfide-based battery. With such a configuration, it is possible to ensure the safety of the sulfide-based battery by the halogen-based battery, thereby providing a battery module with more excellent safety.

In a tenth aspect of the present disclosure, for example, in the battery module according to any one of the first to eighth aspects, the sulfide-based battery and the halogen-based battery each may have principal surfaces and a side surface, the at least one halogen-based battery may include a first halogen-based battery and a third halogen-based battery, the first halogen-based battery may cover one of the principal surfaces of the sulfide-based battery, and the third halogen-based battery may cover the other principal surface of the sulfide-based battery and the side surface of the sulfide-based battery. With such a configuration, it is possible to ensure the safety of the sulfide-based battery by the halogen-based battery, thereby providing a battery module with more excellent safety.

In an eleventh aspect of the present disclosure, for example, in the battery module according to any one of the first to eighth aspects, the sulfide-based battery and the halogen-based battery each may have a principal surface and a side surface, the at least one halogen-based battery may include a first halogen-based battery and a fourth halogen-based battery, the first halogen-based battery may cover the principal surface of the sulfide-based battery, and the fourth halogen-based battery may cover the side surface of the sulfide-based battery. With such a configuration, it is possible to ensure the safety of the sulfide-based battery by the halogen-based battery, thereby providing a battery module with more excellent safety.

In a twelfth aspect of the present disclosure, for example, the battery module according to any one of the first to eleventh aspects may further include a second battery case formed of a flexible packaging material, wherein inside the second battery case, the sulfide-based battery and the halogen-based battery may be disposed so as to share the second battery case, and inside the first battery case, an assembly including the sulfide-based battery, the halogen-based battery, and the second battery case may be disposed. With such a configuration, it is possible to reduce the volume of the assembly, thereby achieving an increased capacity of the battery module.

In a thirteenth aspect of the present disclosure, for example, in the battery module according to any one of the first to twelfth aspects, the sulfide-based battery may include an electrolyte solution containing an organic substance. With such a configuration, it is possible to provide a battery module in which the safety is ensured by a halogen-based battery and the output characteristics of a sulfide-based battery are improved.

In a fourteenth aspect of the present disclosure, for example, in the battery module according to the thirteenth aspect, the halogen-based battery may be free of the electrolyte solution. With such a configuration, it is possible to provide a battery module including a halogen-based battery with improved safety.

A vehicle according to a fifteenth aspect of the present disclosure includes:

the battery module according to any one of the first to fourteenth aspects; and an electric motor configured to be driven by electric power supplied from the battery module.

According to the fifteenth aspect, the electric motor is driven by electric power supplied from the battery module having an excellent balance between output characteristics and safety, and accordingly it is possible to safely move persons and luggage with excellent output characteristics.

A method of manufacturing a battery module according to a sixteenth aspect of the present disclosure includes:
  disposing at least one sulfide-based battery inside a first battery case; and
  disposing at least one halogen-based battery inside the first battery case.

According to the sixteenth aspect, it is possible to manufacture a battery module having an excellent balance between the output characteristics of a sulfide-based battery and the safety of a halogen-based battery.

In a seventeenth aspect of the present disclosure, for example, in the method according to the sixteenth aspect, the at least one sulfide-based battery may include a plurality of sulfide-based batteries, the at least one halogen-based battery may include a plurality of halogen-based batteries, and in the method, the plurality of sulfide-based batteries and the plurality of halogen-based batteries may be disposed inside the first battery case such that the sulfide-based battery and the halogen-based battery are arranged alternately in a predetermined direction. With such a configuration, it is possible to manufacture a battery module having a more excellent balance between the output characteristics of a sulfide-based battery and the safety of a halogen-based battery.

In an eighteenth aspect of the present disclosure, for example, the method according to the sixteenth or seventeenth aspect may further include: disposing, inside a second battery case formed of a flexible packaging material, the at least one sulfide-based battery and the at least one halogen-based battery such that the second battery case is shared; and disposing, inside the first battery case, an assembly including the at least one sulfide-based battery, the at least one halogen-based battery, and the second battery case. With such a configuration, it is possible to reduce the volume of the assembly, thereby achieving an increased capacity of a battery module thus manufactured.

In the drawings referenced in embodiments described below, coordinate axes may be indicated. The X-axis direction of the coordinate axes will be described as, for example, the thickness direction of a battery. The Y-axis direction will be described as the horizontal direction of the battery, and the Z-axis direction will be described as the vertical direction of the battery. A surface parallel to the Y-Z plane of the battery will be described as a principal surface. The principal surface can be an upper surface or a lower surface of the battery. The principal surface is, for example, one of a pair of widest surfaces of the battery. Surfaces of the battery other than the principal surface will be described as side surfaces.

Embodiment 1

Embodiment 1 will be described below with reference to FIG. 1A to FIG. 1C.

[Configuration]

Figure 1B:
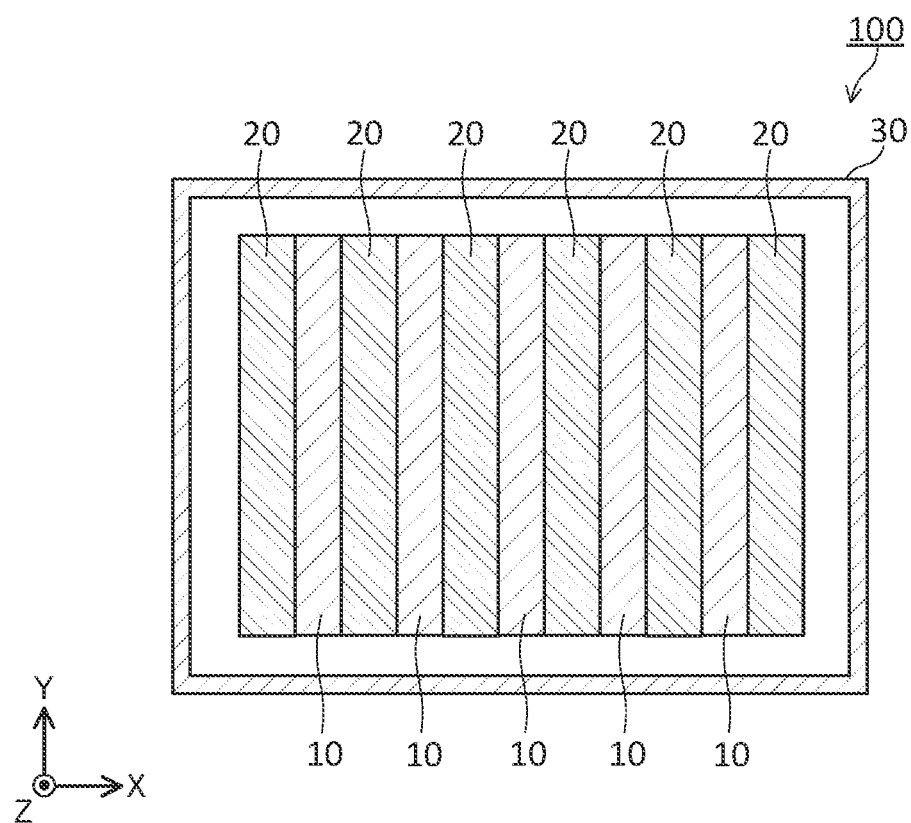
FIG. 1B is a schematic cross-sectional view of the battery module of Embodiment 1, taken along a plane parallel to the X-Y plane.
Figure 1C:
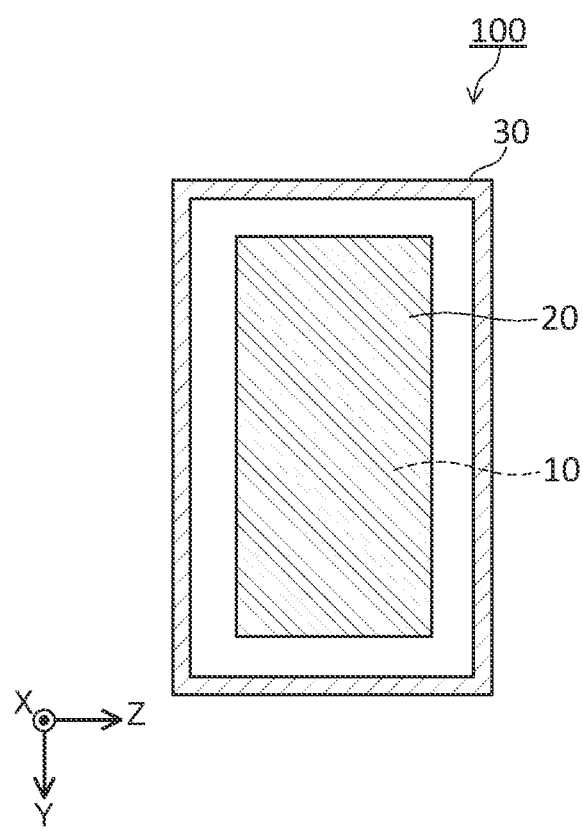
FIG. 1C is a schematic cross-sectional view of the battery module of Embodiment 1, taken along a plane parallel to the Y-Z plane.

FIG. 1A is a schematic cross-sectional view of a battery module of Embodiment 1, taken along a plane parallel to the Z-X plane. FIG. 1B is a schematic cross-sectional view of the battery module of Embodiment 1, taken along a plane parallel to the X-Y plane. FIG. 1C is a schematic cross-sectional view of the battery module of Embodiment 1, taken along a plane parallel to the Y-Z plane.

A battery module 100 of Embodiment 1 includes a plurality of sulfide-based batteries 10, a plurality of halogen-based batteries 20, and a battery case 30. The plurality of sulfide-based batteries 10 and the plurality of halogen-based batteries 20 are disposed inside the battery case 30. The battery module 100 includes at least one sulfide-based battery 10 and at least one halogen-based battery 20. The number of the sulfide-based batteries 10 and the number of the halogen-based batteries 20 included in the battery module 100 are not particularly limited.

The sulfide-based battery 10 is a battery using a sulfide-based solid electrolyte. The sulfide-based battery 10 may be a unit cell.

The sulfide-based battery 10 may include an electrolyte solution containing an organic substance. Including the electrolyte solution improves the output characteristics of the sulfide-based battery 10. As the electrolyte solution, a liquid in which an electrolyte is dissolved in an organic solvent is used. As the organic solvent, an organic solvent for electrolyte solutions of batteries is used. As the electrolyte, an electrolyte for electrolyte solutions of batteries is used. Examples of the electrolyte solution include an ionic liquid. The ionic liquid is in liquid form at normal temperature and thus is characterized by having low volatility and a high decomposition temperature.

The sulfide-based battery 10 is rectangular in plan view from the thickness direction, and is plate-like. The X-axis direction is the thickness direction. The sulfide-based battery 10 may have another shape. The shape of the sulfide-based battery 10 may be a cube or a rectangular parallelepiped.

The sulfide-based battery 10 is implemented, for example, as a battery cell in which a power generation element including a positive electrode, a negative electrode, and an electrolyte layer is sealed in an outer package. The sulfide-based battery 10 may be a lithium secondary battery cell. The outer package is formed of, for example, a laminated film. The laminated film is, for example, an aluminum laminated film for batteries.

The sulfide-based battery 10 includes a positive electrode, an electrolyte layer including a sulfide-based solid electrolyte, and a negative electrode in this order.

The positive electrode includes a positive electrode active material that can occlude and release metal ions (e.g., lithium ions). As the positive electrode active material, a known active material for positive electrodes of batteries is generally used.

The negative electrode includes a negative electrode active material that can occlude and release metal ions (e.g., lithium ions). As the negative electrode active material, a known active material for negative electrodes of batteries is generally used.

The halogen-based battery 20 is a battery including a halogen-based solid electrolyte. The halogen-based battery 20 may be a unit cell. The halogen-based battery 20 is, for example, an all-solid-state battery including no liquid electrolyte.

The halogen-based battery 20 is rectangular in plan view from the thickness direction, and is plate-like. The X-axis direction is the thickness direction. In the present embodiment, the area of the principal surface of the halogen-based battery 20 is equal to the area of the principal surface of the sulfide-based battery 10. The halogen-based battery 20 may have another shape. The shape of the halogen-based battery 20 may be a cube or a rectangular parallelepiped. The halogen-based battery 20 may have a single-layer structure or a laminated structure.

The halogen-based battery 20 is implemented, for example, as a battery cell in which a power generation element including a positive electrode, a negative electrode, and an electrolyte layer is sealed in an outer package. The halogen-based battery 20 may be a lithium secondary battery cell. The outer package is formed of, for example, a laminated film.

The halogen-based battery 20 includes a positive electrode, an electrolyte layer including a halogen-based solid electrolyte, and a negative electrode in this order.

The positive electrode includes a positive electrode active material that can occlude and release metal ions (e.g., lithium ions). As the positive electrode active material, a known active material for positive electrodes of batteries is generally used.

The negative electrode includes a negative electrode active material that can occlude and release metal ions (e.g., lithium ions). As the negative electrode active material, a known active material for negative electrodes of batteries is generally used.

In the present disclosure, the term "sulfide-based solid electrolyte" means a solid electrolyte containing sulfide. In the present disclosure, the term "halogen-based solid electrolyte" means a solid electrolyte containing a halogen element. The halogen-based solid electrolyte includes at least one selected from the group consisting of a halide solid electrolyte and an oxyhalide solid electrolyte.

The sulfide-based battery 10 is, for example, a battery in which the main component of a solid electrolyte included in a portion of an electrolyte layer is a sulfide-based solid electrolyte. The halogen-based battery 20 is, for example, a battery in which the main component of a solid electrolyte included in a portion of an electrolyte layer is a halogen-based solid electrolyte. The term "main component" means a component contained in the largest amount by volume ratio. A halogen-based solid electrolyte may be included in the electrolyte layer of the sulfide-based battery 10. A sulfide-based solid electrolyte may be included in the electrolyte layer of the halogen-based battery 20.

The sulfide-based solid electrolyte may be, for example, $Li_2S-P_2S_5$, $Li_2S-SiS_2$, $Li_2S-B_2S_3$, $Li_2S-GeS_2$, $Li_{3.25}Ge_{0.25}P_{0.75}S_4$, or $Li_{10}GeP_2S_{12}$. Furthermore, LiX, $Li_2O$, $MO_q$, $Li_pMO_q$, or the like may be added to these. Here, the element X is at least one selected from the group consisting of F, Cl, Br, and I. Moreover, the element M is at least one selected from the group consisting of P, Si, Ge, B, Al, Ga, In, Fe, and Zn. The signs p and q are each a natural number. With the above configuration, it is possible to further improve the output characteristics of the battery. One or two or more sulfide-based solid electrolytes selected from the above materials can be used.

The halide solid electrolyte can be, for example, a material containing Li, M1, and X1. Here, the element M is at least one selected from the group consisting of a metalloid element and a metal element other than Li. The element X1 is at least one selected from the group consisting of F, Cl, Br, and I. With the above configuration, the ionic conductivity of the halide solid electrolyte can be further improved. Accordingly, the output characteristics of the battery can be further improved. Furthermore, the thermal stability of the battery can be improved. The halide solid electrolyte may be free of sulfur. In the case where the halide solid electrolyte is free of sulfur, generation of a hydrogen sulfide gas can be suppressed.

The halide solid electrolyte may be, for example, a material represented by the following composition formula (1).

$$Li_{\alpha 1}M_{\beta 1}X_{\gamma 1} \quad \text{Formula (1)}$$

Here, $\alpha 1$, $\beta 1$, and $\gamma 1$ are each a value greater than 0. The sign $\gamma 1$ can be, for example, 4 or 6. With the above configuration, the ionic conductivity of the halide solid electrolyte can be improved. Accordingly, the output characteristics of the battery can be improved.

In the composition formula (1), the element M may include Y (=yttrium). That is, the halide solid electrolyte may contain Y as a metal element. With the above configuration, the ionic conductivity of the solid electrolyte can be further improved. Accordingly, the charge and discharge characteristics of the battery can be further improved.

Halide solid electrolytes containing Y each may be, for example, a compound represented by a composition formula $Li_aMe_bY_cX_6$. Here, a+mb+3c=6 and c>0 are satisfied. The element Me is at least one selected from the group consisting of a metalloid element and a metal element other than Li and Y. The sign m represents the valence of the element Me. The element X is at least one selected from the group consisting of F, Cl, Br, and I.

The element Me may be, for example, at least one selected from the group consisting of Mg, Ca, Sr, Ba, Zn, Sc, Al, Ga, Bi, Zr, Hf, Ti, Sn, Ta, and Nb.

As the halide solid electrolyte, the following materials can be used, for example. With the following configuration, the ionic conductivity of the solid electrolyte can be further improved. Accordingly, the output characteristics of the battery can be further improved.

The halide solid electrolyte may be a material represented by the following composition formula (A1).

$$Li_{6-3d}Y_dX_6 \quad \text{Formula (A1)}$$

In the composition formula (A1), the element X is at least one selected from the group consisting of Cl, Br, and I. Also, 0<d<2 is satisfied.

The halide solid electrolyte may be a material represented by the following composition formula (A2).

$$Li_3YX_6 \quad \text{Formula (A2)}$$

In the composition formula (A2), the element X is at least one selected from the group consisting of Cl, Br, and I.

The halide solid electrolyte may be a material represented by the following composition formula (A3).

$$Li_{3-3\delta}Y_{1+\delta}Cl_6 \quad \text{Formula (A3)}$$

In the composition formula (A3), 0<δ≤0.15 is satisfied.

The halide solid electrolyte may be a material represented by the following composition formula (A4).

$$Li_{3-3\delta}Y_{1+\delta}Br_6 \quad \text{Formula (A4)}$$

In the composition formula (A4), 0<δ≤0.25 is satisfied.

The halide solid electrolyte may be a material represented by the following composition formula (A5).

$$Li_{3-3\delta+a}Y_{1+\delta-a}Me_aCl_{6-x-y}Br_xI_y \quad \text{Formula (A5)}$$

In the composition formula (A5), the element Me is at least one selected from the group consisting of Mg, Ca, Sr, Ba, and Zn. Also, −1<δ<2, 0<a<3, 0<(3−3δ+a), 0<(1+δ−a), 0≤x≤6, 0≤y≤6, and (x+y)≤6 are satisfied.

The halide solid electrolyte may be a material represented by the following composition formula (A6).

$$Li_{3-3\delta}Y_{1+\delta-a}Me_aCl_{6-x-y}Br_xI_y \quad \text{Formula (A6)}$$

In the composition formula (A6), the element Me is at least one selected from the group consisting of Al, Sc, Ga, and Bi. Also, −1<δ<1, 0<a<2, 0<(1+δ−a), 0≤x≤6, 0≤y≤6, and (x+y)≤6 are satisfied.

The halide solid electrolyte may be a material represented by the following composition formula (A7).

$$Li_{3-3\delta-a}Y_{1+\delta-a}Me_aCl_{6-x-y}Br_xI_y \quad \text{Formula (A7)}$$

In the composition formula (A7), the element Me is at least one selected from the group consisting of Zr, Hf, and Ti. Also, $-1<\delta<1$, $0<a<1.5$, $0<(3-3\delta-a)$, $0<(1+\delta-a)$, $0\le x\le 6$, $0\le y\le 6$, and $(x+y)\le 6$ are satisfied.

The halide solid electrolyte may be a material represented by the following composition formula (A8).

$$Li_{3-3\delta-2a}Y_{1+\delta-a}Me_aCl_{6-x-y}Br_xI_y \quad \text{Formula (A8)}$$

In the composition formula (A8), the element Me is at least one selected from the group consisting of Ta and Nb. Also, $-1<\delta<1$, $0<a<1.2$, $0<(3-3\delta-2a)$, $0<(1+\delta-a)$, $0\le x\le 6$, $0\le y\le 6$, and $(x+y)\le 6$ are satisfied.

As the halide solid electrolyte, more specifically, $Li_3YX_6$, $Li_2MgX_4$, $Li_2FeX_4$, $Li(Al, Ga, In)X_4$, $Li_3(Al, Ga, In)X_6$, or the like can be used. Here, the element X is at least one selected from the group consisting of Cl, Br, and I. In the present disclosure, the expression "(Al, Ga, In)" represents at least one element selected from the group consisting of elements in parentheses. That is, the expression "(Al, Ga, In)" is synonymous with the expression "at least one selected from the group consisting of Al, Ga, and In". The same applies to other elements.

The oxyhalide solid electrolyte may be, for example, a solid electrolyte represented by the following composition formula (B1).

$$LiM2_bO_cX2_d \quad \text{Formula (B1)}$$

In the above composition formula (B1), a, b, c, and d are positive real numbers. M2 is at least one selected from the group consisting of Ta and Nb. X2 is at least one selected from the group consisting of Cl, Br, and I.

X2 contained in the solid electrolyte represented by Formula (B1) may include Cl. Owing to Cl contained, the solid electrolyte can have higher ionic conductivity and also can have higher oxidation stability. The oxyhalide solid electrolyte may be free of sulfur.

M2 contained in the solid electrolyte represented by Formula (B1) may include Ta. Owing to Ta contained, the solid electrolyte can have higher ionic conductivity and also can have higher oxidation stability.

The sulfide-based battery 10 may include only a solid electrolyte as an electrolyte. That is, the sulfide-based battery 10 may be a solid-state battery. The halogen-based battery 20 may include only a solid electrolyte as an electrolyte. That is, the halogen-based battery 20 may be a solid-state battery. With such a configuration, the safety of the battery module 100 further increases.

The battery case 30 is a hollow housing in which the plurality of sulfide-based batteries 10 and the plurality of halogen-based batteries 20 are accommodated. The battery case 30 is in a substantially rectangular parallelepiped shape. The battery case 30 may be formed of a metal material or a resin material.

The battery case 30 is an example of a first battery case. The outer package formed of a laminated film is an example of a second battery case. However, the battery case 30, which is the first battery case, may be the outer package itself formed of a laminated film. In this case, the sulfide-based battery 10 and the halogen-based battery 20 are disposed inside a single outer package.

[Disposition of Sulfide-Based Battery and Halogen-Based Battery]

Inside the battery case 30, the plurality of sulfide-based batteries 10 and the plurality of halogen-based batteries 20 are arranged alternately in a predetermined direction. Accordingly, the battery module 100 having an excellent balance between the output characteristics of the sulfide-based battery 10 and the safety of the halogen-based battery 20 is implemented. In the present embodiment, the "predetermined direction" is the thickness direction and the arrangement direction of the sulfide-based battery 10 and the halogen-based battery 20. In FIG. 1A to FIG. 1C, the X-axis direction is the thickness direction and the arrangement direction.

The halogen-based battery 20 is disposed in contact with the sulfide-based battery 10 that is adjacent to the halogen-based battery 20. In detail, the principal surface of the sulfide-based battery 10 is in surface contact with the principal surface of the halogen-based battery 20. In the case where the halogen-based battery 20 and the sulfide-based battery 10 are each implemented as a battery cell in which a power generation element including a positive electrode, a negative electrode, and an electrolyte layer is sealed in an outer package, the outer package covering the principal surface of the sulfide-based battery 10 is in contact with the outer package covering the principal surface of the halogen-based battery 20. With such a configuration, the halogen-based battery 20 acts as a barrier to prevent the spread of fire from a specific sulfide-based battery 10 to other sulfide-based batteries 10. As a result, the safety of the battery module 100 improves.

Inside the battery case 30, the halogen-based battery 20 is positioned at each of one end and the other end in the arrangement direction of the sulfide-based battery 10 and the halogen-based battery 20. Owing to the halogen-based battery 20 positioned at each of the ends, the safety of the battery module 100 improves.

The plurality of sulfide-based batteries 10 may be arranged in succession. That is, two or more sulfide-based batteries 10 may be sandwiched between two halogen-based batteries 20. Two or more sulfide-based batteries 10 may be disposed in succession at one end and/or the other end in the arrangement direction. In these cases, the sulfide-based battery 10 improves the output characteristics of the battery module 100. The plurality of halogen-based batteries 20 may be arranged in succession. That is, two or more halogen-based batteries 20 may be sandwiched between two sulfide-based batteries 10. Two or more halogen-based batteries 20 may be disposed in succession at one end and/or the other end in the arrangement direction. In these cases, the halogen-based battery 20 improves the safety of the battery module 100. The principal surface of at least one sulfide-based battery 10 may not be in contact with the principal surface of the halogen-based battery 20. For example, the halogen-based battery 20 and the sulfide-based battery 10 may have a gap therebetween. Such a configuration also improves the safety of the battery module 100, compared to a battery module including only the sulfide-based battery 10. Inside the battery case 30, a support member supporting the plurality of sulfide-based batteries 10 and the plurality of halogen-based batteries 20 may be provided. The support member enables stable disposition of the plurality of sulfide-based batteries 10 and the plurality of halogen-based batteries 20.

Next, a method of manufacturing the above-described battery module 100 will be described. The manufacturing method described in the present embodiment can be applied to other embodiments described later.

Figure 2:
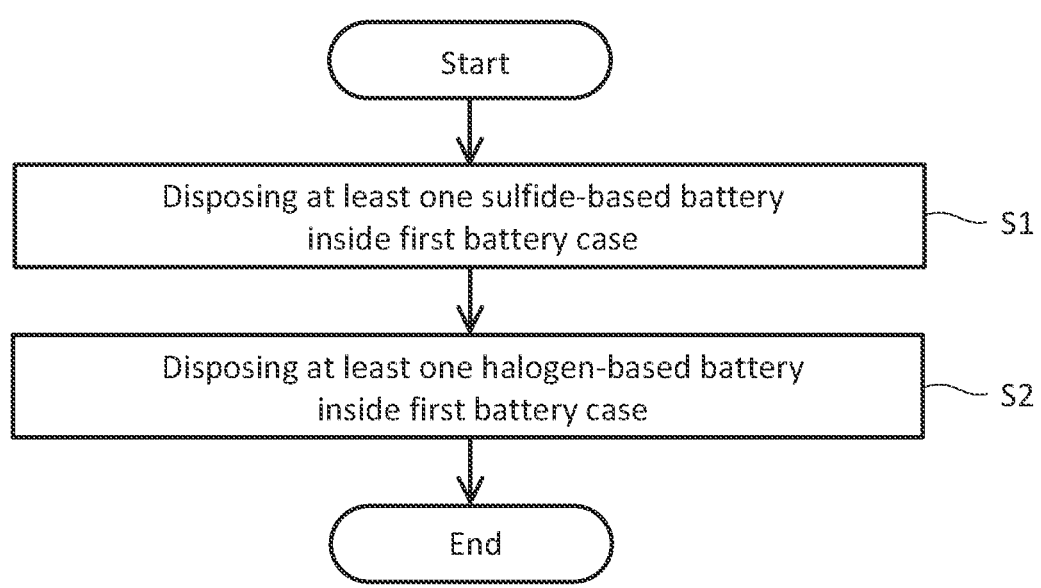
FIG. 2 is a flowchart showing a method of manufacturing the battery module of Embodiment 1.

FIG. 2 is a flowchart showing a method of manufacturing the battery module 100 of Embodiment 1. The method of manufacturing the battery module 100 includes disposing at least one sulfide-based battery 10 inside the first battery case (Step S1) and disposing at least one halogen-based battery 20 inside the first battery case (Step S2). Although Step S2 is performed after Step S1 in the example in FIG. 2, Step S1 and Step S2 may be performed in any order. Step S1 and Step S2 may be performed simultaneously.

In the method of manufacturing the battery module 100 of Embodiment 1, the plurality of sulfide-based batteries 10 and the plurality of halogen-based batteries 20 may be disposed inside the first battery case such that the sulfide-based battery 10 and the halogen-based battery 20 are arranged alternately in the predetermined direction.

In the method of manufacturing the battery module 100 of Embodiment 1, the sulfide-based battery 10 and the halogen-based battery 20 may be arranged such that the battery module 100 with the configuration described above can be obtained.

Some other embodiments will be described below. Elements that are common to Embodiment 1 and the other embodiments are denoted by the same reference numerals, and descriptions thereof may be omitted. Descriptions of the individual embodiments can be applied to each other, as long as they are not technically contradictory. The embodiments may also be combined with each other, as long as such a combination is not technically contradictory.

Embodiment 2

Figure 3A:
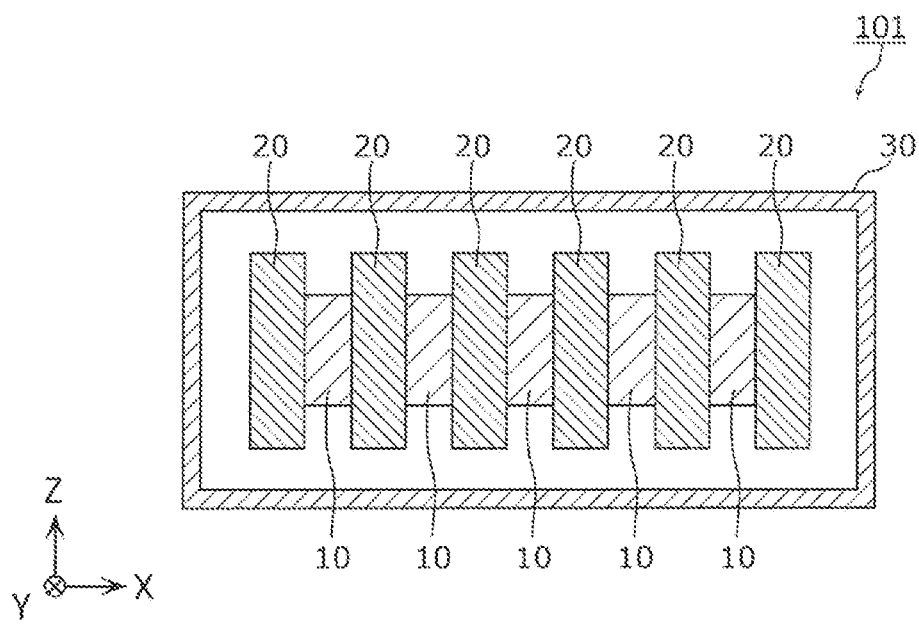
FIG. 3A is a schematic cross-sectional view of a battery module of Embodiment 2, taken along a plane parallel to the Z-X plane.
Figure 3B:
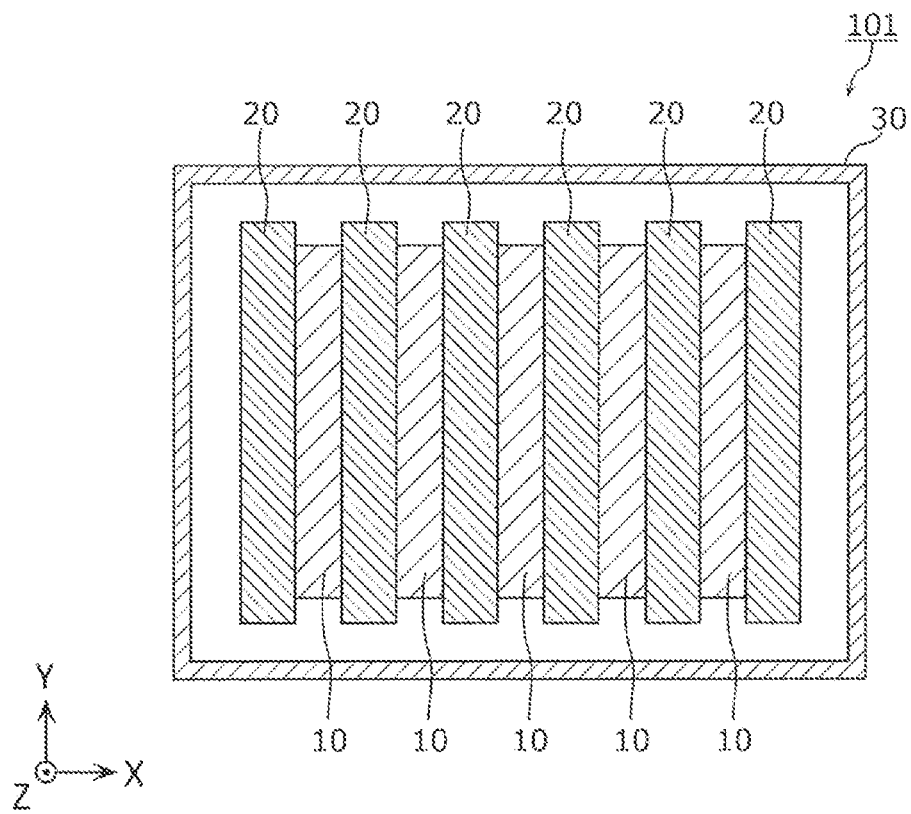
FIG. 3B is a schematic cross-sectional view of the battery module of Embodiment 2, taken along a plane parallel to the X-Y plane.
Figure 3C:
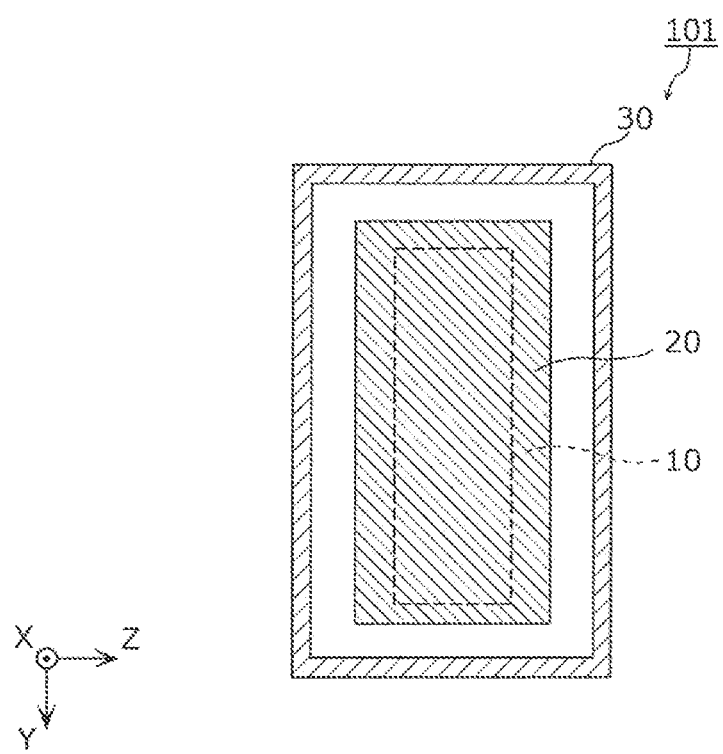
FIG. 3C is a schematic cross-sectional view of the battery module of Embodiment 2, taken along a plane parallel to the Y-Z plane.

FIG. 3A is a schematic cross-sectional view of a battery module of Embodiment 2, taken along a plane parallel to the Z-X plane. FIG. 3B is a schematic cross-sectional view of the battery module of Embodiment 2, taken along a plane parallel to the X-Y plane. FIG. 3C is a schematic cross-sectional view of the battery module of Embodiment 2, taken along a plane parallel to the Y-Z plane.

In a battery module 101 of Embodiment 2, the area of the principal surface of the halogen-based battery 20 is larger than the area of the principal surface of the sulfide-based battery 10. That is, in the battery module 101, the outer shape of the halogen-based battery 20 has a size larger than the outer shape of the sulfide-based battery 10. This implements the battery module 101 in which the output characteristics of the sulfide-based battery 10 are maintained and the safety of the halogen-based battery 20 is improved.

Inside the battery case 30, the plurality of sulfide-based batteries 10 and the plurality of halogen-based batteries 20 are disposed such that, when the halogen-based battery 20 and the sulfide-based battery 10 are viewed in plan from the thickness direction of the halogen-based battery 20, the entire outline of the sulfide-based battery 10 is inside the outline of the halogen-based battery 20. Accordingly, the halogen-based battery 20 adjacent to the sulfide-based battery 10 acts as a barrier to prevent the spread of fire from a specific sulfide-based battery 10 to other sulfide-based batteries 10.

In the method of manufacturing the battery module 101 of Embodiment 2, the sulfide-based battery 10 and the halogen-based battery 20 may be arranged such that the battery module 101 with the configuration described above can be obtained.

Embodiment 3

Figure 4A:
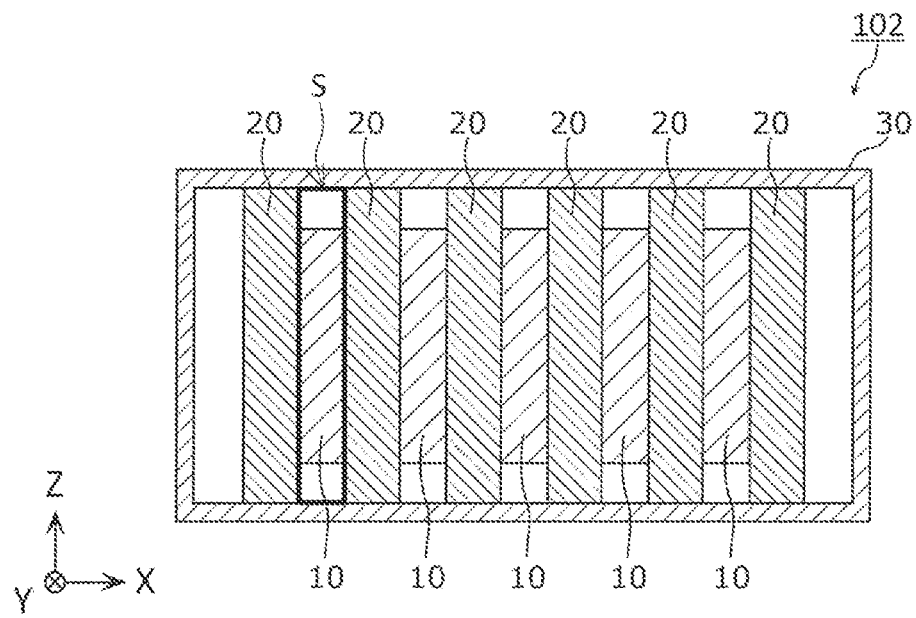
FIG. 4A is a schematic cross-sectional view of a battery module of Embodiment 3, taken along a plane parallel to the Z-X plane.
Figure 4B:
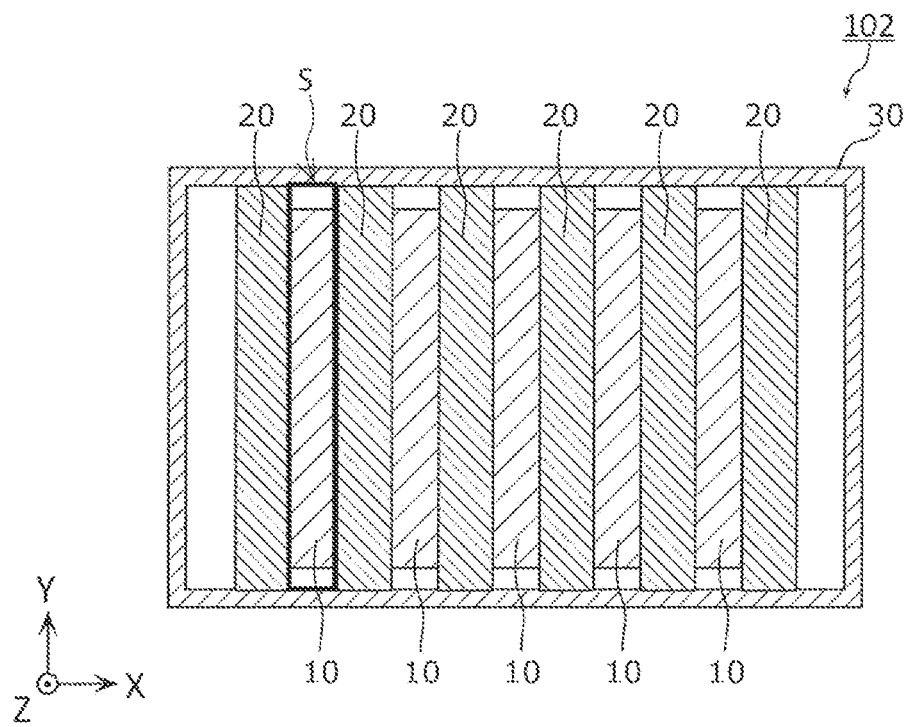
FIG. 4B is a schematic cross-sectional view of the battery module of Embodiment 3, taken along a plane parallel to the X-Y plane.
Figure 4C:
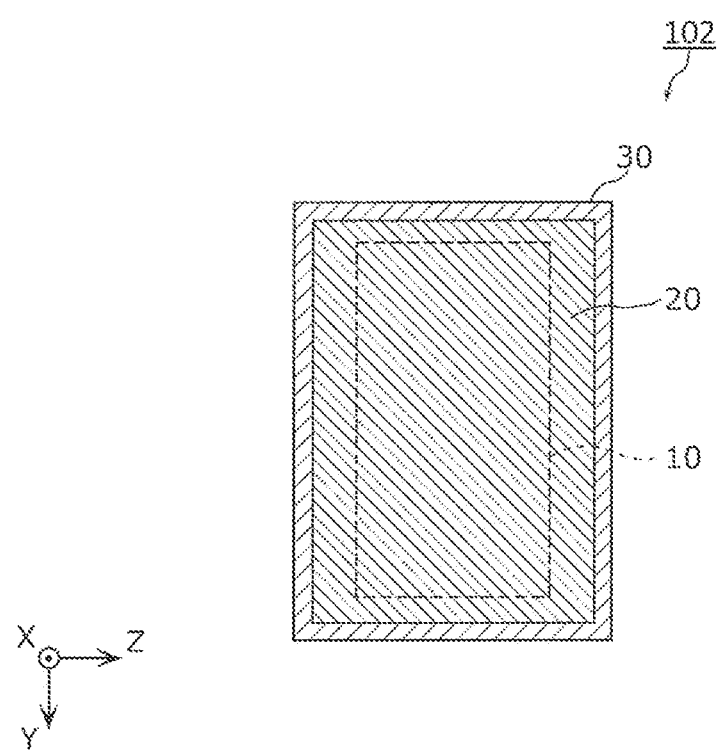
FIG. 4C is a schematic cross-sectional view of the battery module of Embodiment 3, taken along a plane parallel to the Y-Z plane.

FIG. 4A is a schematic cross-sectional view of a battery module of Embodiment 3, taken along a plane parallel to the Z-X plane. FIG. 4B is a schematic cross-sectional view of the battery module of Embodiment 3, taken along a plane parallel to the X-Y plane. FIG. 4C is a schematic cross-sectional view of the battery module of Embodiment 3, taken along a plane parallel to the Y-Z plane.

In a battery module 102 of Embodiment 3, a space S is formed by the principal surfaces of two halogen-based batteries 20 and the inner wall of the battery case 30. The space S can be a substantially closed space. It is not a necessity that the space S is a sealed space.

Inside the battery case 30, all the side surfaces of each of the plurality of halogen-based batteries 20 are in contact with the inner wall of the battery case 30. The plurality of sulfur-based batteries 10 are each disposed in the space S enclosed by one principal surface of each of two adjacent halogen-based batteries 20 with the sulfur-based battery 10 sandwiched therebetween and the inner wall of the battery case 30. Accordingly, it is possible to ensure the safety of the sulfur-based battery 10 by the halogen-based battery 20, thereby implementing the battery module 102 with more excellent safety.

In the method of manufacturing the battery module 102 of Embodiment 3, the sulfide-based battery 10 and the halogen-based battery 20 may be arranged such that the battery module 102 with the configuration described above can be obtained.

Embodiment 4

Figure 5A:
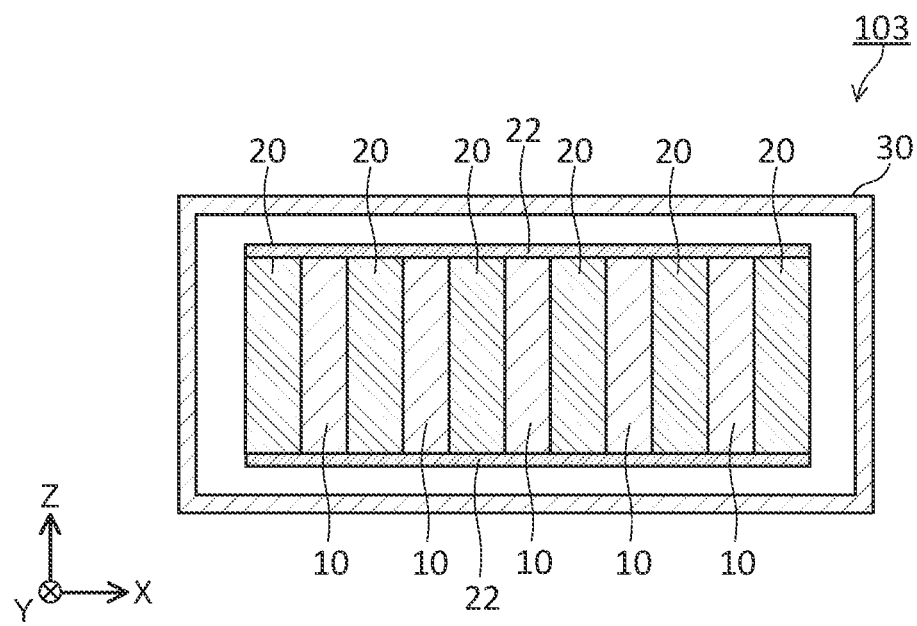
FIG. 5A is a schematic cross-sectional view of a battery module of Embodiment 4, taken along a plane parallel to the Z-X plane.
Figure 5B:
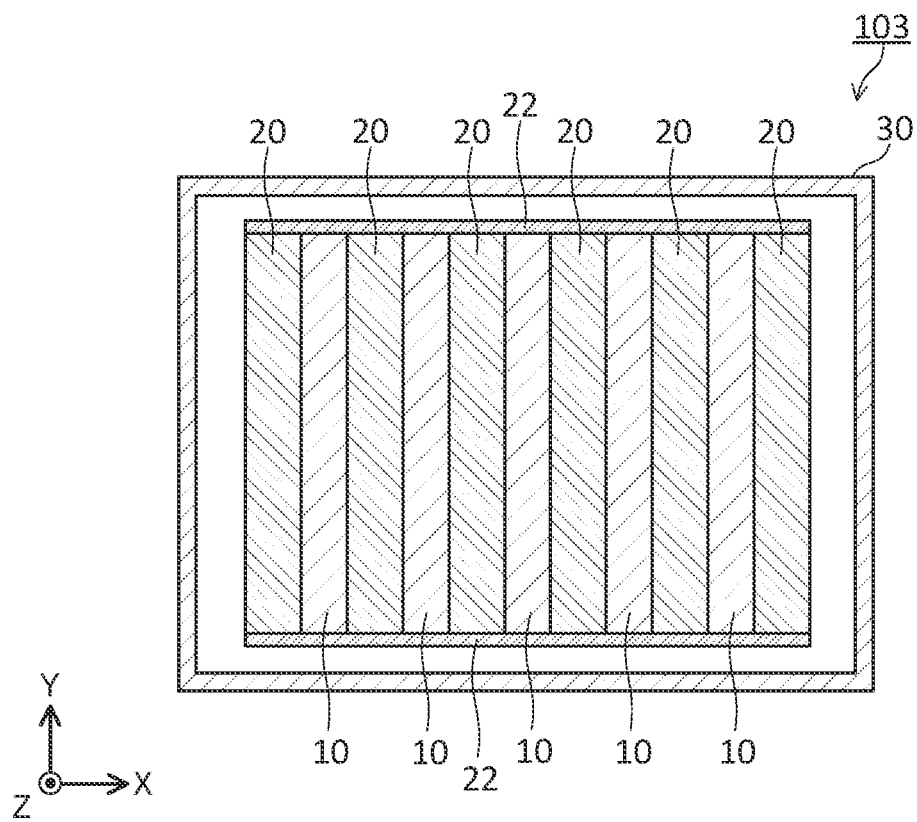
FIG. 5B is a schematic cross-sectional view of the battery module of Embodiment 4, taken along a plane parallel to the X-Y plane.
Figure 5C:
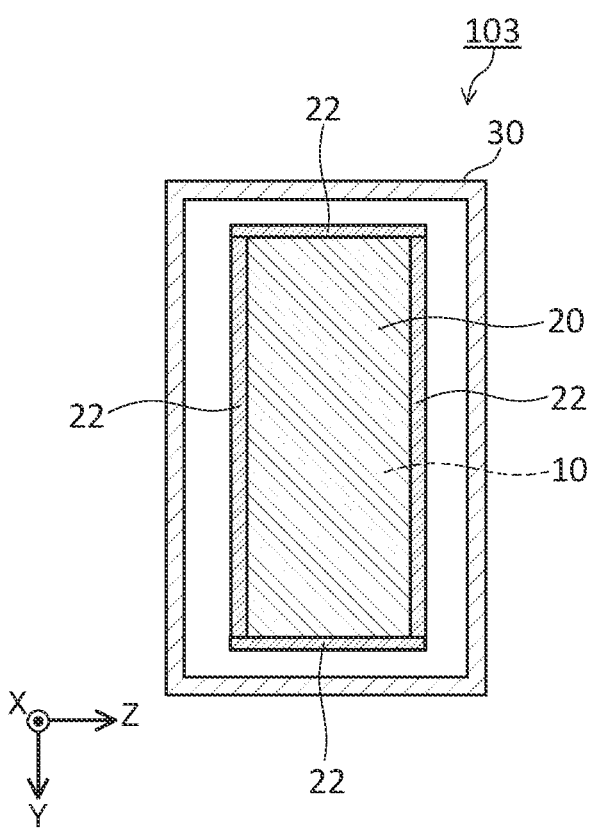
FIG. 5C is a schematic cross-sectional view of the battery module of Embodiment 4, taken along a plane parallel to the Y-Z plane.

FIG. 5A is a schematic cross-sectional view of a battery module of Embodiment 4, taken along a plane parallel to the Z-X plane. FIG. 5B is a schematic cross-sectional view of the battery module of Embodiment 4, taken along a plane parallel to the X-Y plane. FIG. 5C is a schematic cross-sectional view of the battery module of Embodiment 4, taken along a plane parallel to the Y-Z plane.

A battery module 103 of Embodiment 4 includes the plurality of sulfide-based batteries 10, the plurality of halogen-based batteries 20, and a plurality of halogen-based batteries 22. The halogen-based battery 20 is an example of a first halogen-based battery. The halogen-based battery 22 is an example of a second halogen-based battery.

The composition of the solid electrolyte used for the halogen-based battery 22 may be the same as or different from the composition of the solid electrolyte used for the halogen-based battery 20. The halogen-based battery 22 may be a unit cell.

The halogen-based battery 22 is rectangular in plan view from the vertical direction or the horizontal direction, and is plate-like. The Z-axis direction is the vertical direction. The Y-axis direction is the horizontal direction. The halogen-based battery 22 may have another shape. The shape of the halogen-based battery 22 may be a cube or a rectangular parallelepiped. The halogen-based battery 22 may have a single-layer structure or a laminated structure.

Four halogen-based batteries 22 are disposed in correspondence to the side surfaces of the halogen-based battery 20 and the sulfide-based battery 10 in the four directions so as to enclose the side surfaces from the four directions. Therefore, inside the battery case 30, the halogen-based battery 20 covers the principal surface of the sulfide-based battery 10, and the halogen-based battery 22 covers the side surfaces of the halogen-based battery 20 and the sulfide-based battery 10. That is, every surface of the sulfide-based battery 10 is covered with the halogen-based battery 20 or the halogen-based battery 22. Accordingly, it is possible to ensure the safety of the sulfide-based battery 10 by the halogen-based battery 20 and the halogen-based battery 22, thereby implementing the battery module 103 with more excellent safety. The halogen-based battery 22 does not necessarily need to be disposed so as to enclose the side surfaces of the halogen-based battery 20 and the sulfide-based battery 10 from the four directions, and may be disposed so as to cover the side surfaces of the halogen-based battery 20 and the sulfide-based battery 10 from at least one of the four directions.

In the method of manufacturing the battery module 103 of Embodiment 4, the sulfide-based battery 10, the halogen-based battery 20, and the halogen-based battery 22 may be arranged such that the battery module 103 with the configuration described above can be obtained.

Modification 1

Figure 6:
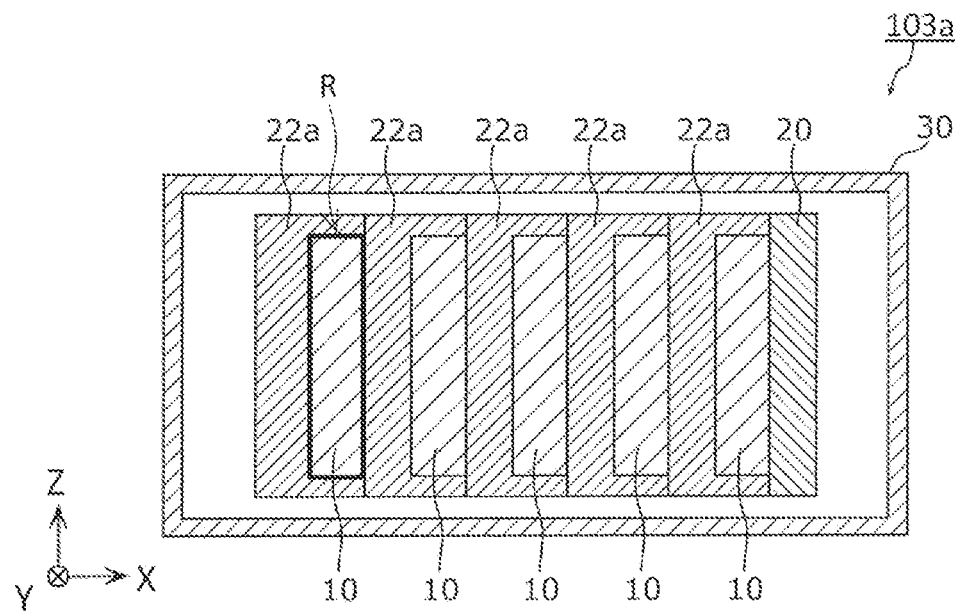
FIG. 6 is a schematic cross-sectional view of a battery module of Modification 1 of Embodiment 4, taken along a plane parallel to the Z-X plane.

FIG. 6 is a schematic cross-sectional view of a battery module according to Modification 1, taken along a plane parallel to the Z-X plane. A battery module 103a includes the plurality of sulfide-based batteries 10, the one halogen-based battery 20, and a plurality of halogen-based batteries 22a. The halogen-based battery 20 is an example of the first halogen-based battery. The halogen-based battery 22a is an example of a third halogen-based battery.

The battery module 103a includes the plurality of halogen-based batteries 22a in addition to the one halogen-based battery 20. The composition of the solid electrolyte used for the halogen-based battery 22a may be the same as or different from the composition of the solid electrolyte used for the halogen-based battery 20. The halogen-based battery 22a may be a unit cell.

The halogen-based battery 22a has a recess R for receiving the sulfide-based battery 10. The recess R is open toward the thickness direction (X-axis direction) of the halogen-based battery 22a. The recess R has almost the same shape and size as the outer shape of the sulfide-based battery 10.

The halogen-based battery 22a with the sulfide-based battery 10 received in the recess R is plate-like, where the X-axis direction is the thickness direction. The halogen-based battery 22a has a size allowing one sulfide-based battery 10 to be embedded. The halogen-based battery 22a may have another shape. The halogen-based battery 22a may have a single-layer structure or a laminated structure.

Inside the battery case 30, the halogen-based battery 22a covers, by the recess R, one principal surface the sulfide-based battery 10 and all the side surfaces of the sulfide-based battery 10. The other principal surface of the sulfide-based battery 10 is in contact with one principal surface of an adjacent halogen-based battery 22a in which the recess R is not formed. The halogen-based battery 20 is disposed in the opening direction of the halogen-based battery 22a disposed at the end. One principal surface of the halogen-based battery 20 is in contact with one principal surface of an adjacent sulfur-based battery 10 that is not in contact with the halogen-based battery 22a. Thus, every principal surface and side surface of each of the plurality of sulfide-based batteries 10 are covered with the halogen-based battery 20 or the halogen-based battery 22a. Accordingly, it is possible to ensure the safety of the sulfide-based battery 10 by the halogen-based battery 20 and the halogen-based battery 22a, thereby implementing the battery module 103a with more excellent safety.

In the method of manufacturing the battery module 103a of Modification 1, the sulfide-based battery 10, the halogen-based battery 20, and the halogen-based battery 22a may be arranged such that the battery module 103a with the configuration described above can be obtained.

Modification 2

Figure 7:
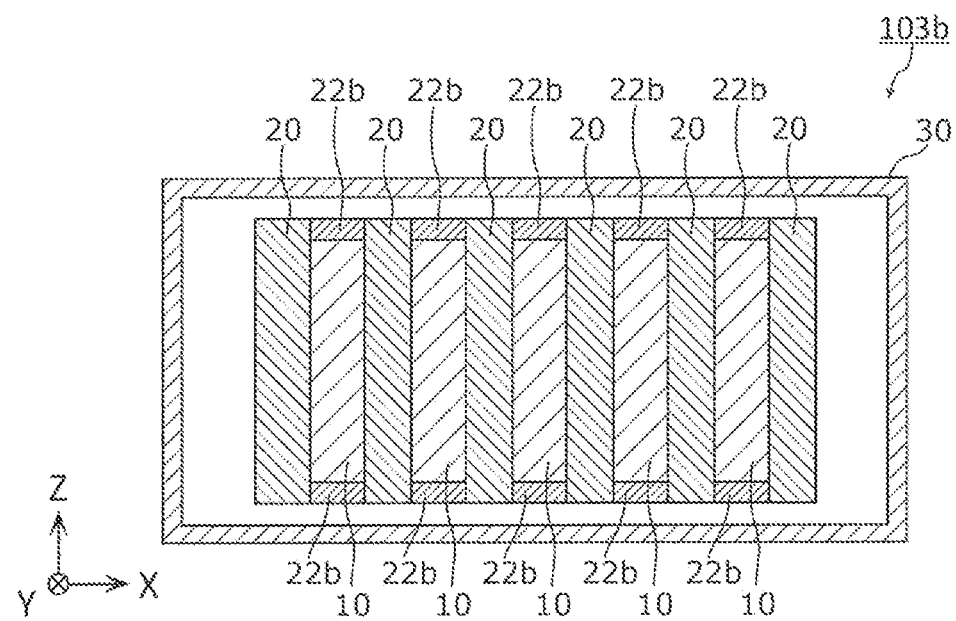
FIG. 7 is a schematic cross-sectional view of a battery module of Modification 2 of Embodiment 4, taken along a plane parallel to the Z-X plane.

FIG. 7 is a schematic cross-sectional view of a battery module according to Modification 2, taken along a plane parallel to the Z-X plane. A battery module 103b according to Modification 2 includes the plurality of sulfide-based batteries 10, the plurality of halogen-based batteries 20, and a plurality of halogen-based batteries 22b. The halogen-based battery 20 is an example of the first halogen-based battery. The halogen-based battery 22b is an example of a fourth halogen-based battery.

The battery module 103b includes the plurality of halogen-based batteries 22b in addition to the plurality of halogen-based batteries 20. The composition of the solid electrolyte used for the halogen-based battery 22b may be the same as or different from the composition of the solid electrolyte used for the halogen-based battery 20. The halogen-based battery 22b may be a unit cell.

The halogen-based battery 22b is rectangular in plan view from the vertical direction or the horizontal direction, and is plate-like. The Z-axis direction is the vertical direction. The Y-axis direction is the horizontal direction. The halogen-based battery 22b may have another shape. The shape of the halogen-based battery 22b may be a cube or a rectangular parallelepiped. The halogen-based battery 22b may have a single-layer structure or a laminated structure.

Four halogen-based batteries 22b are disposed in correspondence to the side surfaces of one sulfide-based battery 10 in the four directions so as to enclose the side surfaces from the four directions. Therefore, inside the battery case 30, the halogen-based battery 20 covers the principal surface of the sulfide-based battery 10, and the halogen-based battery 22b covers the side surface of the sulfide-based battery 10. That is, every surface of the sulfide-based battery 10 is covered with the halogen-based battery 20 or the halogen-based battery 22b. Accordingly, it is possible to ensure the safety of the sulfide-based battery 10 by the halogen-based battery 20 and the halogen-based battery 22b, thereby implementing the battery module 103b with more excellent safety. The halogen-based battery 22b does not necessarily need to be disposed so as to enclose the side surface of one sulfide-based battery 10 from the four directions, and may be disposed so as to cover the side surface of one sulfide-based battery 10 from at least one of the four directions.

In the method of manufacturing the battery module 103b of Modification 2, the sulfide-based battery 10, the halogen-based battery 20, and the halogen-based battery 22b may be arranged such that the battery module 103b with the configuration described above can be obtained.

Embodiment 5

Figure 8:
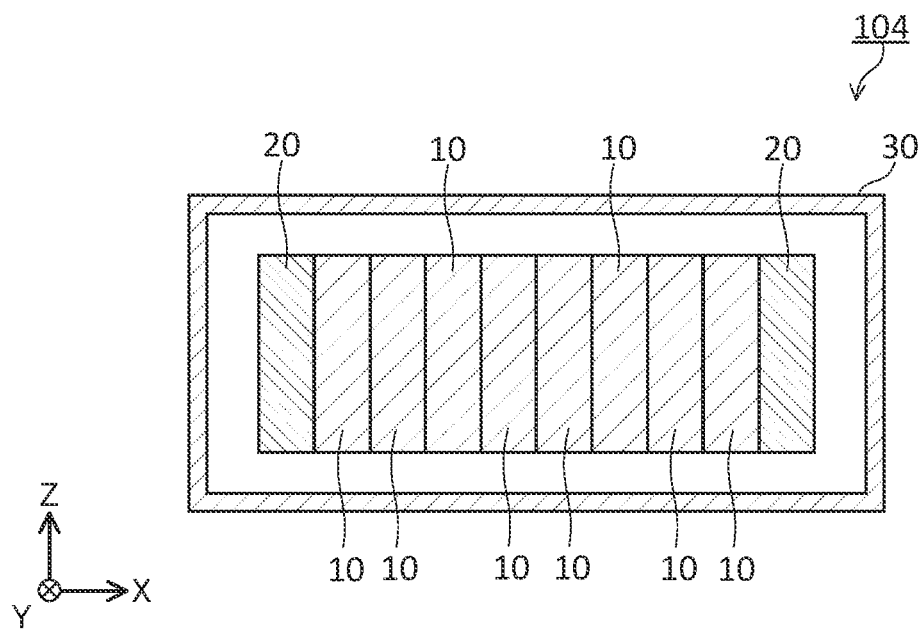
FIG. 8 is a schematic cross-sectional view of a battery module of Embodiment 5, taken along a plane parallel to the Z-X plane.

FIG. 8 is a schematic cross-sectional view of a battery module of Embodiment 5, taken along a plane parallel to the Z-X plane. A battery module 104 includes the plurality of sulfide-based batteries 10 and the plurality of halogen-based batteries 20. In the present embodiment, the number of the sulfide-based batteries 10 is larger than the number of the halogen-based batteries 20. The number of the sulfide-based batteries 10 and the number of the halogen-based batteries 20 included in the battery module 104 are not particularly limited.

Inside the battery case 30, the halogen-based battery 20 is positioned at each of one end and the other end in the arrangement direction (X-axis direction). The plurality of sulfide-based batteries 10 are sandwiched between two halogen-based batteries 20. Accordingly, it is possible to implement the battery module 104 in which the safety of the halogen-based battery 20 is ensured and the output characteristics of the sulfide-based battery 10 are further improved.

In the method of manufacturing the battery module 104 of Embodiment 5, the sulfide-based battery 10 and the halogen-based battery 20 may be arranged such that the battery module 104 with the configuration described above can be obtained.

Embodiment 6

Figure 9:
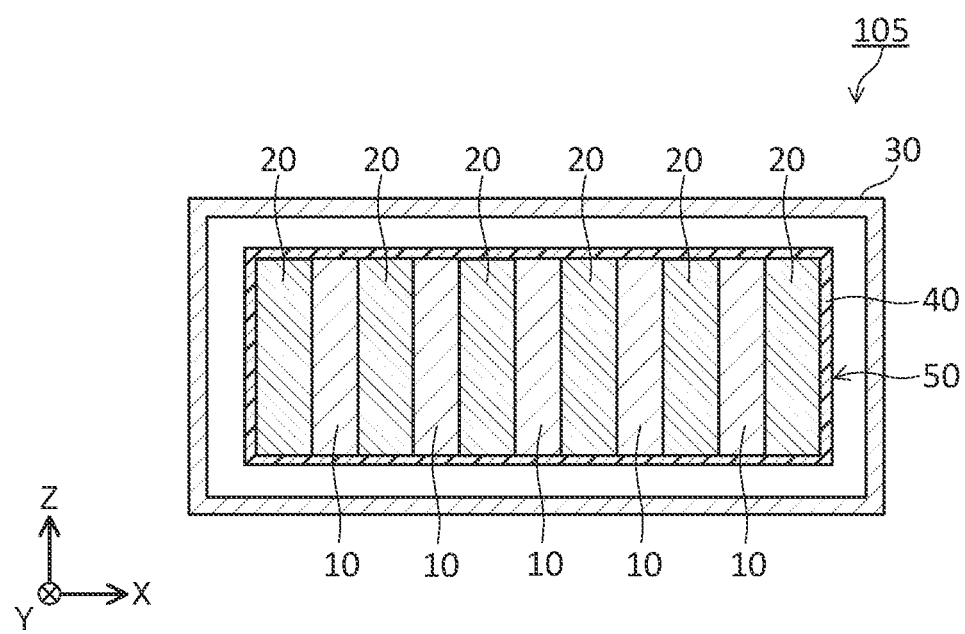
FIG. 9 is a schematic cross-sectional view of a battery module of Embodiment 6, taken along a plane parallel to the Z-X plane.

FIG. 9 is a schematic cross-sectional view of a battery module of Embodiment 6, taken along a plane parallel to the Z-X plane. A battery module 105 includes the plurality of sulfide-based batteries 10, the plurality of halogen-based batteries 20, the battery case 30, and a laminated film 40. The number of the sulfide-based batteries 10 and the number of the halogen-based batteries 20 included in the battery module 105 are not particularly limited. In the present embodiment, the sulfide-based battery 10 and the halogen-based battery 20 are disposed inside the laminated film 40 so as to share the laminated film 40. An assembly 50 including the sulfide-based battery 10, the halogen-based battery 20, and the laminated film 40 is disposed inside the battery case 30. The plurality of assemblies 50 may be disposed inside the battery case 30. As the disposition of the sulfide-based battery 10 and the halogen-based battery 20, any one of the dispositions in the embodiments and modifications described above can be adopted, for example.

According to the present embodiment, it is possible to reduce the amount of the laminated film 40 used per unit capacity. This contributes to an improvement in energy density of the battery module 105.

In the assembly 50, the sulfide-based battery 10 and the halogen-based battery 20 may or may not be in electrical contact with each other. In the former, for example, a positive electrode current collector of the sulfide-based battery 10 may be in contact with a negative electrode current collector of the halogen-based battery 20, and a negative electrode current collector of the sulfide-based battery 10 may be in contact with a positive electrode current collector of the halogen-based battery 20. In the latter, an insulating layer such as a resin film may be provided between the sulfide-based battery 10 and the halogen-based battery 20.

Next, a method of manufacturing the above-described battery module 105 will be described.

Figure 10:
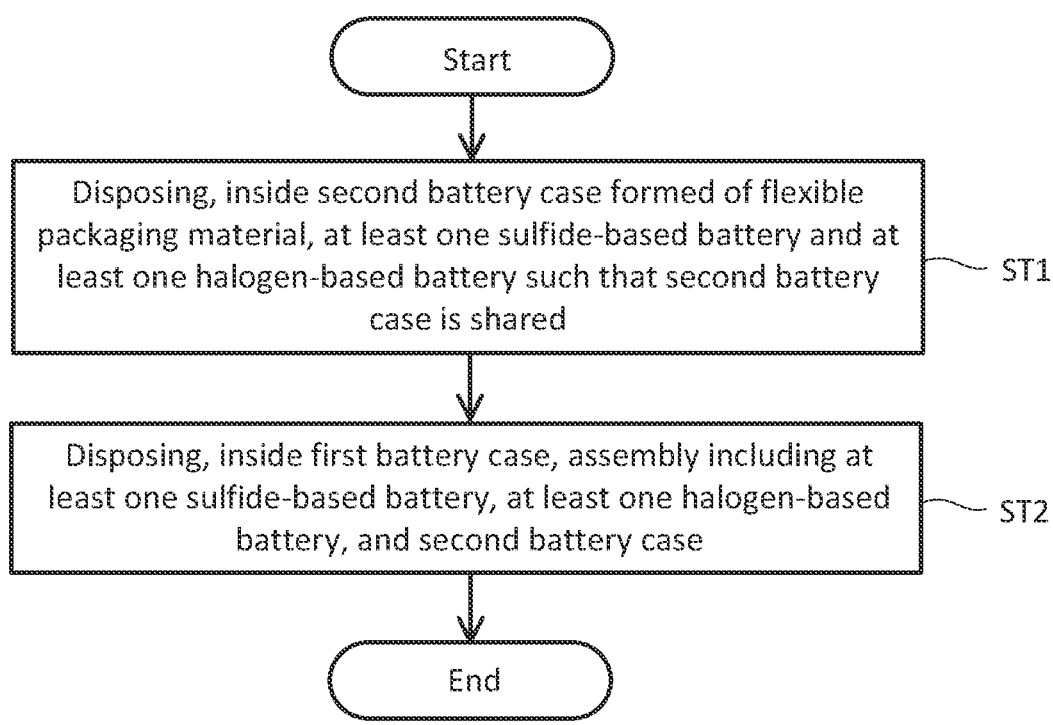
FIG. 10 is a flowchart showing a method of manufacturing the battery module of Embodiment 6.

FIG. 10 is a flowchart showing the method of manufacturing the battery module 105 of Embodiment 6. The method of manufacturing the battery module 105 includes disposing, inside the second battery case formed of a flexible packaging material, at least one sulfide-based battery 10 and at least one halogen-based battery 20 such that the second battery case is shared (Step ST1). Step ST1 includes forming the assembly 50 that includes the at least one sulfide-based battery 10, the at least one halogen-based battery 20, and the second battery case. The manufacturing method includes disposing the assembly 50 inside the first battery case (Step ST2).

In the method of manufacturing the battery module 105 of Embodiment 6, the sulfide-based battery 10 and the halogen-based battery 20 may be arranged such that the battery module 105 with the configuration described above can be obtained.

Embodiment 7

Figure 11:
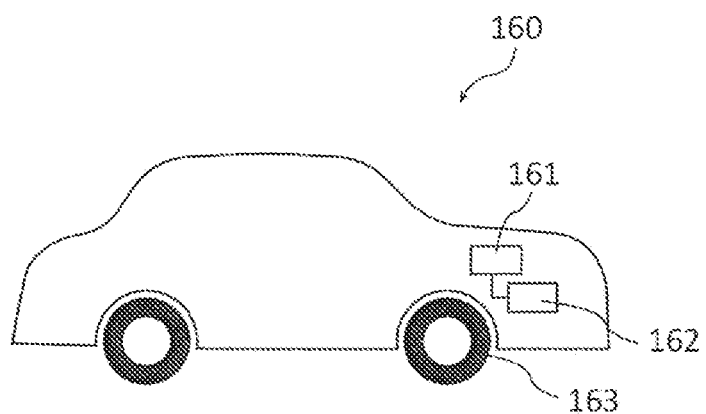
FIG. 11 is an illustrative diagram schematically showing the configuration of a vehicle of Embodiment 7.

FIG. 11 is an illustrative diagram schematically showing the configuration of a vehicle of Embodiment 7. A vehicle 160 of Embodiment 7 is, for example, an electric automobile. The vehicle 160 includes an electric motor 161, a battery module 162, and wheels 163. The battery module 162 is the battery module of any one of the embodiments and modifications described above. The vehicle 160 may include the plurality of battery modules 162. The battery module 162 supplies electric power to the electric motor 161 to drive the electric motor 161. The electric motor 161 rotates the wheels 163 to move the vehicle 160. The vehicle 160 may be another automobile such as a hybrid car. Alternatively, the vehicle 160 may be another vehicle such as an electric train, an airplane, or a ship.

As described above, in the present embodiment, the vehicle 160 includes the battery module 162 including the sulfide-based battery with excellent output characteristics and the halogen-based battery with high safety. With such a configuration, the electric motor 161 is driven by electric power supplied from the battery module 162 having an excellent balance between output characteristics and safety, and accordingly it is possible to safely move persons and luggage with excellent output characteristics.

Other Embodiments

In the battery module of the present disclosure, the sulfide-based battery and the halogen-based battery may have a wound power generation element. The wound power generation element may be plate-like or cylindrical. Furthermore, the sulfide-based battery and the halogen-based battery may have a structure in which the wound power generation element is accommodated in a cylindrical outer package. The battery module of the present disclosure may have a device such as a sensor and a controller. Devices other than the batteries may be disposed in an empty space of the battery case 30.

In the battery module of the present disclosure, an oxide-based battery or another battery may be used instead of the sulfide-based battery. An oxide-based battery or another battery may be used instead of the halogen-based battery. Batteries vary in characteristics depending on the solid electrolyte to be used. A battery using an oxide solid electrolyte as the solid electrolyte has excellent heat resistance. A battery using, for example, a complex hydride solid electrolyte as the solid electrolyte has excellent lithium-ion conductivity. Therefore, with the above configuration, it is possible to provide a battery module in which advantages of the oxide-based battery or advantages of another battery using a complex hydride solid electrolyte or the like are incorporated.

That is, the battery module of the present disclosure may include: the first battery case; at least one oxide-based battery disposed inside the first battery case or at least one other battery disposed inside the first battery case; and at least one halogen-based battery disposed inside the first battery case. In the case where the oxide-based battery and the halogen-based battery are included, it is possible to provide a battery module in which the heat resistance of the oxide-based battery and the safety of the halogen-based battery are both achieved. In the case where a battery including a complex hydride solid electrolyte is included as the other battery, it is possible to provide a battery module in which the lithium-ion conductivity of the complex hydride solid electrolyte and the safety of the halogen-based battery are both achieved. Thus, it is possible to provide a battery module in which the advantages of the oxide-based battery or the advantages of the other battery are incorporated.

Furthermore, the battery module of the present disclosure may include: the first battery case; at least one sulfide-based battery disposed inside the first battery case; and at least one oxide-based battery disposed inside the first battery case or at least one other battery disposed inside the first battery case. In the case where the sulfide-based battery and the oxide-based battery are included, it is possible to provide a battery module in which the output characteristics of the sulfide-based battery and the heat resistance of the oxide-based battery are both achieved. In the case where a battery including a complex hydride solid electrolyte is included as the other battery, it is possible to provide a battery module in which the output characteristics of the sulfide-based battery and the lithium-ion conductivity of the complex hydride solid electrolyte are both achieved. Thus, it is possible to provide a battery module in which the advantages of the oxide-based battery or the advantages of the other battery are incorporated.

Examples of the oxide-based battery include a battery in which the main component of a solid electrolyte included in an electrolyte layer is an oxide solid electrolyte. The term "main component" means a component contained in the largest amount by mass ratio.

In the present disclosure, the term "oxide solid electrolyte" means a solid electrolyte containing oxygen as major anions. The oxide solid electrolyte may further contain anions other than sulfur and a halogen element as anions other than oxygen.

Examples of the oxide solid electrolyte include: a NASICON solid electrolyte typified by $LiTi_2(PO_4)_3$ and element-substituted substances thereof; a $(LaLi)TiO_3$ perovskite solid electrolyte; a LISICON solid electrolyte typified by $Li_{14}ZnGe_4O_{16}$, $Li_4SiO_4$, and $LiGeO_4$ and element-substituted substances thereof; a garnet solid electrolyte typified by $Li_7La_3Zr_2O_{12}$ and element-substituted substances thereof; $Li_3PO_4$ and N-substituted substances thereof; and glass or glass ceramics that include a Li—B—O compound such as $LiBO_2$ or $Li_3BO_3$ as a base and to which $Li_2SO_4$, $Li_2CO_3$, or the like has been added. One or two or more oxide solid electrolytes selected from the above materials can be used as the electrolyte layer.

Examples of the other battery include a battery in which the main component of a solid electrolyte included in an electrolyte layer is a complex hydride solid electrolyte.

Examples of the complex hydride solid electrolyte include $LiBH_4$—LiI and $LiBH_4$—$P_2S_5$.

In the battery module of the present disclosure, an oxide-based battery and another battery may be used instead of the sulfide-based battery and the halogen-based battery. That is, the battery module of the present disclosure may include the first battery case, at least one oxide-based battery disposed inside the first battery case, and at least one other battery disposed inside the first battery case. For example, in the case where the other battery is a battery including a complex hydride solid electrolyte, it is possible to provide a battery module in which the heat resistance of the oxide-based battery and the lithium-ion conductivity of the complex hydride solid electrolyte are both achieved. Thus, it is possible to provide a battery module in which the advantages of the oxide-based battery and the advantages of the other battery are incorporated.

The aspects described in Embodiments 1 to 7 can be applied to the battery modules described above as the other embodiments.

INDUSTRIAL APPLICABILITY

The present disclosure is useful as a battery module having an excellent balance between output characteristics and safety.

What is claimed is:

1. A battery module comprising:
    a first battery case;
    at least one sulfide-based battery disposed inside the first battery case; and
    at least one halogen-based battery disposed inside the first battery case, wherein
    the at least one halogen-based battery is a battery including a halogen-based solid electrolyte,
    each of the at least one sulfide-based battery and the at least one halogen-based battery is plate-like, and
    an area of a principal surface of each of the at least one halogen-based battery is larger than an area of a principal surface of each of the at least one sulfide-based battery.

2. The battery module according to claim 1, wherein
    when the at least one halogen-based battery and the at least one sulfide-based battery are viewed in plan from a thickness direction of the at least one halogen-based battery, an entire outline of the at least one sulfide-based battery is inside an outline of the at least one halogen-based battery.

3. The battery module according to claim 1, wherein
    the at least one halogen-based battery is in contact with the at least one sulfide-based battery.

4. The battery module according to claim 1, wherein
    the at least one halogen-based battery includes a plurality of halogen-based batteries,
    the at least one sulfide-based battery and the plurality of halogen-based batteries are arranged in a predetermined direction inside the first battery case,
    each of the plurality of halogen-based batteries includes two ends, one end being opposite to the other, and
    the two ends of each of the plurality of halogen-based batteries are positioned in the predetermined direction.

5. The battery module according to claim 4, wherein
    the at least one sulfide-based battery includes a plurality of sulfide-based batteries.

6. The battery module according to claim 5, wherein
    the plurality of sulfide-based batteries and the plurality of halogen-based batteries are arranged alternately in the predetermined direction inside the first battery case.

7. The battery module according to claim 4, wherein
    the at least one sulfide-based battery is disposed in a space enclosed by an inner wall of the first battery case and one principal surface of each of two halogen-based batteries among the plurality of halogen-based batteries adjacent to the at least one sulfide-based battery.

8. The battery module according to claim 1, wherein
    the at least one sulfide-based battery and the at least one halogen-based battery each have a principal surface and a side surface,
    the at least one halogen-based battery includes a first halogen-based battery and a second halogen-based battery, the first halogen-based battery covers the principal surface of the at least one sulfide-based battery, and
the second halogen-based battery covers the side surface of the first halogen-based battery and the side surface of the at least one sulfide-based battery.

9. The battery module according to claim 1, wherein
the at least one sulfide-based battery and the at least one halogen-based battery each have two principal surfaces opposite to each other and a side surface,
the at least one halogen-based battery includes a first halogen-based battery and a third halogen-based battery,
the first halogen-based battery covers one of the principal surfaces of the at least one sulfide-based battery, and
the third halogen-based battery covers the other principal surface of the at least one sulfide-based battery and the side surface of the at least one sulfide-based battery.

10. The battery module according to claim 1, wherein
the at least one sulfide-based battery and the at least one halogen-based battery each have a principal surface and a side surface,
the at least one halogen-based battery includes a first halogen-based battery and a fourth halogen-based battery,
the first halogen-based battery covers the principal surface of the at least one sulfide-based battery, and
the fourth halogen-based battery covers the side surface of the at least one sulfide-based battery.

11. The battery module according to claim 1, further comprising
a second battery case formed of a flexible packaging material, wherein
inside the second battery case, the at least one sulfide-based battery and the at least one halogen-based battery are disposed so as to share the second battery case, and
inside the first battery case, an assembly including the at least one sulfide-based battery, the at least one halogen-based battery, and the second battery case is disposed.

12. The battery module according to claim 1, wherein
the at least one sulfide-based battery includes an electrolyte solution containing an organic substance.

13. The battery module according to claim 12, wherein
the at least one halogen-based battery is free of the electrolyte solution.

14. A vehicle comprising:
the battery module according to claim 1; and
an electric motor configured to be driven by electric power supplied from the battery module.

15. A method of manufacturing a battery module, the method comprising:
disposing at least one sulfide-based battery inside a first battery case; and
disposing at least one halogen-based battery inside the first battery case, wherein
the at least one halogen-based battery is a battery including a halogen-based solid electrolyte,
each of the at least one sulfide-based battery and the at least one halogen-based battery is plate-like, and
an area of a principal surface of each of the at least one halogen-based battery is larger than an area of a principal surface of each of the at least one sulfide-based battery.

16. The method according to claim 15, wherein
the at least one sulfide-based battery includes a plurality of sulfide-based batteries,
the at least one halogen-based battery includes a plurality of halogen-based batteries, and
in the method, the plurality of sulfide-based batteries and the plurality of halogen-based batteries are disposed inside the first battery case such that the plurality of sulfide-based batteries and the plurality of halogen-based batteries are arranged alternately in a predetermined direction.

17. The method according to claim 15, further comprising:
disposing, inside a second battery case formed of a flexible packaging material, the at least one sulfide-based battery and the at least one halogen-based battery such that the second battery case is shared; and
disposing, inside the first battery case, an assembly including the at least one sulfide-based battery, the at least one halogen-based battery, and the second battery case.

18. A battery module comprising:
a first battery case;
at least one sulfide-based battery disposed inside the first battery case; and
at least one halogen-based battery disposed inside the first battery case, wherein
the at least one halogen-based battery is a battery including a halogen-based solid electrolyte,
each of the at least one sulfide-based battery and the at least one halogen-based battery is plate-like, and
when the at least one halogen-based battery and the at least one sulfide-based battery are viewed in plan from a thickness direction of the at least one halogen-based battery, an entire outline of the at least one sulfide-based battery is inside an outline of the at least one halogen-based battery and the outline of the at least one halogen-based battery extends outside the entire outline of the at least one sulfide-based battery.

* * * * *